US012624646B2

(12) United States Patent
Sekaran et al.

(10) Patent No.: US 12,624,646 B2
(45) Date of Patent: May 12, 2026

(54) APPARATUS AND METHODS FOR MONITORING PROPULSION SYSTEMS

(71) Applicant: ROLLS-ROYCE PLC, London (GB)

(72) Inventors: Paulas Sekaran, Derby (GB); Philip Naylor, Derby (GB)

(73) Assignee: ROLLS-ROYCE PLC, London (GB)

( * ) Notice: Subject to any disclaimer, the term of this patent is extended or adjusted under 35 U.S.C. 154(b) by 145 days.

(21) Appl. No.: 18/735,467

(22) Filed: Jun. 6, 2024

(65) Prior Publication Data

US 2025/0003351 A1　Jan. 2, 2025

(30) Foreign Application Priority Data

Jun. 29, 2023　(GB) ...................................... 2309830

(51) Int. Cl.
*F01D 21/00*　(2006.01)
*G01M 15/14*　(2006.01)

(52) U.S. Cl.
CPC ........... *F01D 21/003* (2013.01); *G01M 15/14* (2013.01); *F05D 2260/80* (2013.01)

(58) Field of Classification Search
CPC .. F01D 21/003; G01M 15/14; F05D 2260/80; G05B 2219/45071; G05B 23/0213
See application file for complete search history.

(56) References Cited

U.S. PATENT DOCUMENTS

| | | | |
|---|---|---|---|
| 6,304,176 | B1 | 10/2001 | Discenzo |
| 6,934,651 | B2 | 8/2005 | Smaragdis |
| 7,081,693 | B2 | 7/2006 | Hamel et al. |
| 7,231,180 | B2 | 6/2007 | Benson et al. |
| 7,479,876 | B2 | 1/2009 | Carle et al. |
| 7,834,263 | B2 | 11/2010 | DeSteese et al. |
| 8,601,823 | B2 | 12/2013 | Brown |
| 8,982,784 | B2 | 3/2015 | Muller et al. |

(Continued)

FOREIGN PATENT DOCUMENTS

| | | | |
|---|---|---|---|
| EP | 2 244 149 A2 | 10/2010 | |
| EP | 2396971 B1 | 7/2018 | |

(Continued)

OTHER PUBLICATIONS

"High Temperature Magnetic Sensors for the Hot Section of Aeroengines" by Rokicki et al., Aerospace 2021, 8, 21 (Year: 2021).*

(Continued)

*Primary Examiner* — Kito R Robinson
*Assistant Examiner* — Tanya C Sienko
(74) *Attorney, Agent, or Firm* — Oliff PLC

(57) ABSTRACT

An apparatus includes first and second equipment health monitoring systems for a gas turbine engine. At least one parameter of the gas turbine engine to be monitored by the second equipment health monitoring system is different than a plurality of parameters to be monitored by the first equipment health monitoring system. The first equipment health monitoring system is electrically connected to a control system of the gas turbine engine while the second equipment health monitoring system is electrically isolated from the control system. As a result, the second equipment health monitoring system may be physically and electrically separate to other electronic systems of the apparatus.

12 Claims, 6 Drawing Sheets

(56) References Cited

U.S. PATENT DOCUMENTS

| | | | |
|---|---|---|---|
| 9,090,339 B2 | 7/2015 | Arms et al. | |
| 9,385,560 B2 | 7/2016 | Taylor et al. | |
| 9,759,636 B2 | 9/2017 | Murphy | |
| 9,882,428 B2 | 1/2018 | Calhoun et al. | |
| 10,180,340 B2 | 1/2019 | Milota et al. | |
| 2011/0245638 A1 | 10/2011 | McKenna et al. | |
| 2011/0278986 A1 | 11/2011 | Campbell | |
| 2013/0332011 A1 | 12/2013 | Ziarno | |
| 2013/0345993 A1 | 12/2013 | Bellala et al. | |
| 2017/0038277 A1* | 2/2017 | Kemp | G05B 23/0213 |
| 2018/0306054 A1* | 10/2018 | Adibhatla | F04D 29/70 |
| 2018/0328221 A1 | 11/2018 | Hagen et al. | |
| 2020/0047903 A1* | 2/2020 | Bingham | F01D 21/14 |
| 2020/0047905 A1 | 2/2020 | Bingham et al. | |
| 2020/0394517 A1* | 12/2020 | Hall | G05B 23/024 |
| 2021/0140338 A1* | 5/2021 | Girard | F01D 17/08 |
| 2021/0146940 A1 | 5/2021 | Muhlmann et al. | |
| 2023/0184166 A1* | 6/2023 | Hamzehi | F02C 7/06 |
| | | | 701/29.5 |

FOREIGN PATENT DOCUMENTS

| | | |
|---|---|---|
| EP | 3 361 229 A2 | 8/2018 |
| EP | 4194982 A1 | 6/2023 |
| EP | 4194983 A1 | 6/2023 |

OTHER PUBLICATIONS

"Electrified Aircraft Propulsion Systems: Gas Turbine Control Considerations for the Mitigation of Potential Failure Modes and Hazards" D.L. Simon, US Government publication (NASA/TM-20205008249) (Year: 2021).*

"Turbine Meter Training" Kevin Ehman presentation https://www/cdm/fortisbc.com Oct. 8, 2008 (Year: 2008).*

"Need for Robust Sensors for Inherently Fail-Safe Gas Turbine Engine Controls, Monitoring, and Prognostics" A. Behbahani, US Government Publication, AFRL-PR-WP-TP-2007-217 (2006) (Year: 2006).*

"Advanced Data Transfer System Mk2" Flyer from GE Aviation, copyright 2022 (Year: 2022).*

Dec. 27, 2023 Search Report issued in British Patent Application No. 2309830.4.

Bill Nickerson et al. "Development of a Smart Wireless Networkable Sensor for Aircraft Engine Health Management". IEEE, Dec. 18, 2000, vol. 7, pp. 3255-3262.

Dec. 27, 2023 Search Report issued in British Patent Application No. 2309831.2.

U.S. Appl. No. 18/735,495, filed Jun. 6, 2024 in the name of Paulas Sekaran et al.

Nov. 22, 2024 Extended Search Report issued in European Patent Application No. 24178672.2.

Nov. 21, 2024 Extended Search Report issued in European Patent Application No. 24178669.8.

* cited by examiner

78

Vehicle

Apparatus 10, 101, 102

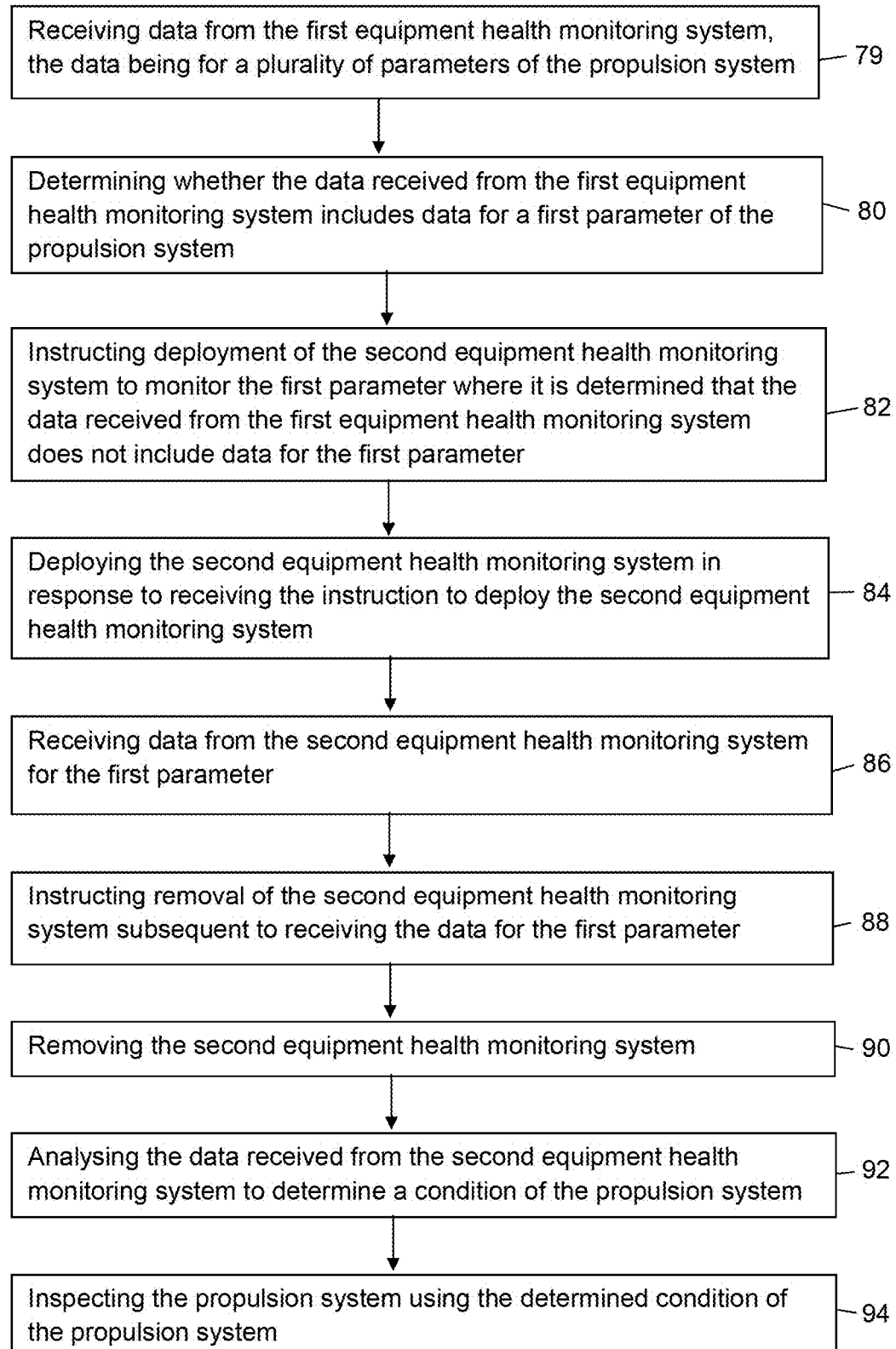

Receiving data from the first equipment health monitoring system, the data being for a plurality of parameters of the propulsion system — 79

Determining whether the data received from the first equipment health monitoring system includes data for a first parameter of the propulsion system — 80

Instructing deployment of the second equipment health monitoring system to monitor the first parameter where it is determined that the data received from the first equipment health monitoring system does not include data for the first parameter — 82

Deploying the second equipment health monitoring system in response to receiving the instruction to deploy the second equipment health monitoring system — 84

Receiving data from the second equipment health monitoring system for the first parameter — 86

Instructing removal of the second equipment health monitoring system subsequent to receiving the data for the first parameter — 88

Removing the second equipment health monitoring system — 90

Analysing the data received from the second equipment health monitoring system to determine a condition of the propulsion system — 92

Inspecting the propulsion system using the determined condition of the propulsion system — 94

Fig. 6

APPARATUS AND METHODS FOR MONITORING PROPULSION SYSTEMS

CROSS-REFERENCE TO RELATED APPLICATIONS

This specification is based upon and claims the benefit of priority from UK Patent Application Number 2309830.4 filed on Jun. 29, 2023, the entire contents of which are incorporated herein by reference.

TECHNOLOGICAL FIELD

The present disclosure concerns apparatus and method for monitoring propulsion systems.

BACKGROUND

Vehicles, such as aircraft, usually include one or more propulsion systems (for example, a heat engine such as a gas turbine engine or a reciprocating engine) for providing thrust and/or electrical power to the propulsion system and vehicle. An equipment health monitoring system may be integrated within the propulsion system and/or the vehicle to enable various parameters (such as pressures, temperatures, and vibrations) of the propulsion system to be monitored. However, such equipment health monitoring systems may add weight to the vehicle, and may increase the fuel consumption of the vehicle when in operation (when flying between airports for example).

BRIEF SUMMARY

According to a first aspect there is provided apparatus comprising: a propulsion system; a first equipment health monitoring system configured to generate data for a plurality of parameters of the propulsion system; a second equipment health monitoring system configured to generate data for one or more parameters of the propulsion system, at least one of the one or more parameters to be monitored by the second equipment health monitoring system being different to the plurality of parameters to be monitored by the first equipment health monitoring system.

The second equipment health monitoring system may include memory configured to store the data for the one or more parameters of the propulsion system.

The memory may be hand removable.

The second equipment health monitoring system may include a transmitter configured to transmit the data for the one or more parameters via a wired or wireless link.

The propulsion system may include a control system configured to control the operation of the propulsion system, the first equipment health monitoring system may be electrically connected to the control system, and the second equipment health monitoring system may be isolated from the control system.

The second equipment health monitoring system may include a clock configured to output a time, the second equipment health monitoring system may be configured to associate the data of the one or more parameters of the propulsion system with the time output by the clock.

The second equipment health monitoring system may comprise an electrical energy storage device configured to supply electrical power to the second equipment health monitoring system.

The electrical energy storage device may be configured to supply electrical power to one or more sensors of the second equipment health monitoring system.

The second equipment health monitoring system may comprise an electrical energy generating device configured to supply electrical power to the second equipment health monitoring system.

The electrical energy generating device may comprise a thermoelectric generator.

Deployment and removal of the second equipment health monitoring system may take less time than deployment and removal of the first equipment health monitoring system.

The propulsion system may comprise a gas turbine engine including a low-pressure compressor casing and a core casing, a processor of the first equipment health monitoring system may be mounted on the low-pressure compressor casing, and a processor of the second equipment health monitoring system may be mounted on the core casing.

The apparatus may further comprise a third equipment health monitoring system configured to generate data for one or more parameters of the propulsion system, at least one of the one or more parameters to be monitored by the third equipment health monitoring system may be different to the plurality of parameters to be monitored by the first equipment health monitoring system, and different to the one or more parameters to be monitored by the second equipment health monitoring system.

According to a second aspect there is provided a vehicle comprising the apparatus as described in any preceding paragraphs of the brief summary.

According to a third aspect there is provided a method comprising: receiving data from a first equipment health monitoring system, the data being for a plurality of parameters of a propulsion system; determining whether the data received from the first equipment health monitoring system includes data for a first parameter of the propulsion system; and instructing deployment of a second equipment health monitoring system to monitor the first parameter where it is determined that the data received from the first equipment health monitoring system does not include data for the first parameter.

The data received from the first equipment health monitoring system may be generated by the first equipment health monitoring system during a first time period in which the propulsion system is operational or is under test.

The method may further comprise deploying the second equipment health monitoring system in response to receiving the instruction to deploy the second equipment health monitoring system.

The method may further comprise receiving data from the second equipment health monitoring system for the first parameter.

The method may further comprise instructing removal of the second equipment health monitoring system subsequent to receiving the data for the first parameter.

The method may further comprise removing the second equipment health monitoring system.

The data received from the second equipment health monitoring system may be generated by the second equipment health monitoring system during a second time period in which the propulsion system is under test or is operational.

The data received from the second equipment health monitoring system may be transferred via a hand portable memory.

The data received from the second equipment health monitoring system may be transferred via a wired or wireless link.

The method may further comprise analysing the data received from the second equipment health monitoring system to determine a condition of the propulsion system.

The method may further comprise inspecting the propulsion system using the determined condition of the propulsion system.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION

Embodiments will now be described by way of example only, with reference to the Figures, in which:

FIG. 6 illustrates a flow diagram of a method for monitoring a propulsion system according to various examples.

DETAILED DESCRIPTION

In the following description, the terms 'connected' and 'coupled' mean operationally connected and coupled. It should be appreciated that there may be any number of intervening components between the mentioned features, including no intervening components.

Figure 1:
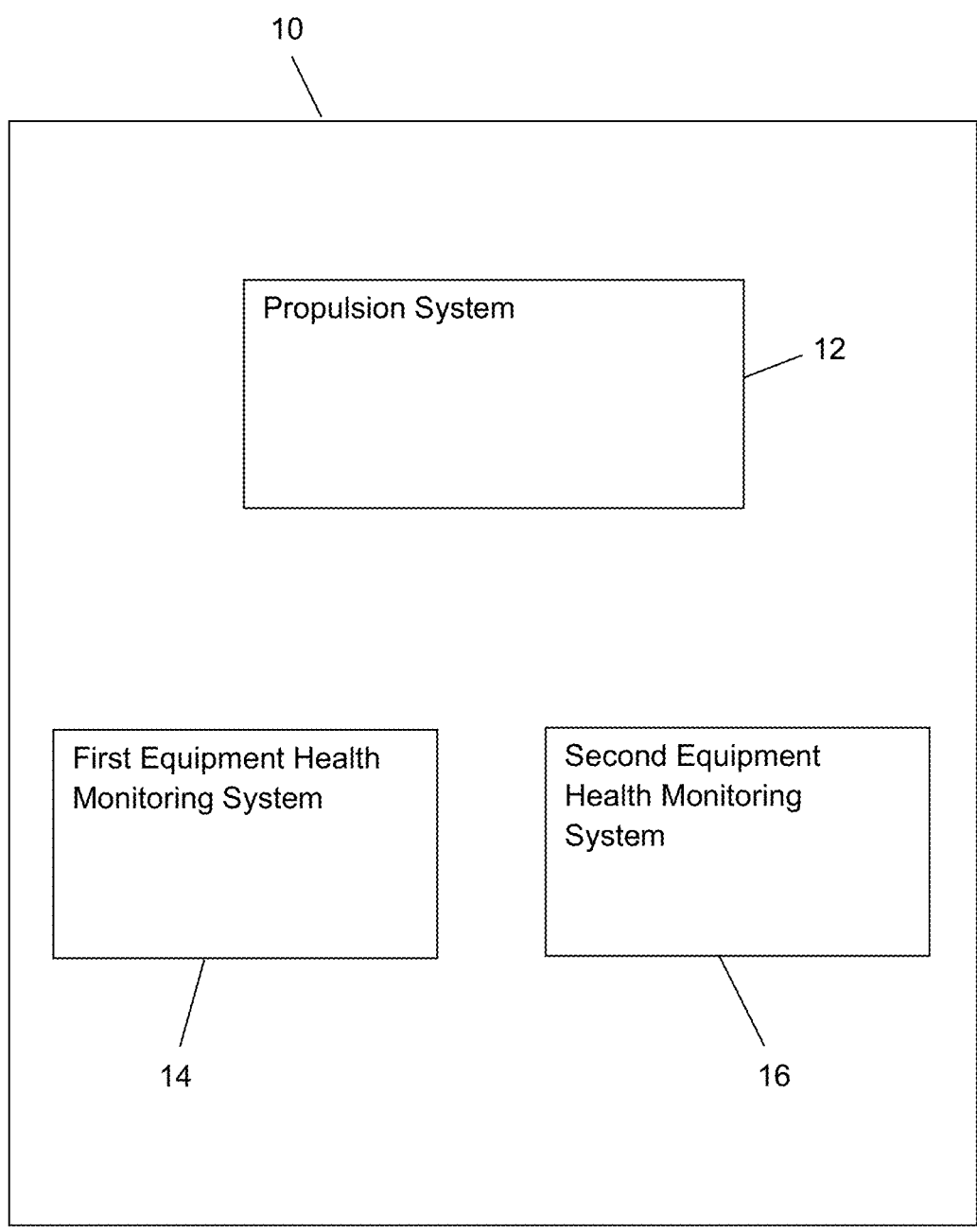
FIG. 1 illustrates a schematic diagram of an apparatus according to various examples.

FIG. 1 illustrates a schematic diagram of an apparatus 10 that includes a propulsion system 12, a first equipment health monitoring system 14 and a second equipment health monitoring system 16.

The first equipment health monitoring system 14 is configured to generate data for a plurality of parameters of the propulsion system 12. The second equipment health monitoring system 16 is also configured to generate data for one or more parameters of the propulsion system 12. However, at least one of the one or more parameters to be monitored by the second equipment health monitoring system 16 is different to the plurality of parameters to be monitored by the first equipment health monitoring system 14. In other words, the second equipment health monitoring system 16 is configured to monitor at least one parameter of the propulsion system 12 that the first equipment health monitoring system 14 is unable to monitor.

As used herein, a 'parameter' of the propulsion system 12 refers to any characteristic that can help in defining or classifying the propulsion system 12. In other words, a 'parameter' of the propulsion system 12 may be a numerical or other measurable factor that forms a set with other such parameters that define the conditions of operation of the propulsion system 12. Such parameters may include mechanical parameters (component speeds, vibrations and strains, for example), electrical parameters (potential differences and currents, for example), and thermodynamic parameters (temperatures and pressures at different locations, for example).

The deployment of the second equipment health monitoring system 16 may take less time than the deployment of the first equipment health monitoring system 14. Similarly, the removal of the second equipment health monitoring system 16 may take less time than the removal of the first equipment health monitoring system 14.

For example, where the first and second equipment health monitoring systems 14, 16 are coupled to the propulsion system 12 via fasteners (such as nuts and bolts for example), the second equipment health monitoring system 16 may require fewer fasteners to be fastened and unfastened than the first equipment health monitoring system 14. By way of another example, where the first and second equipment health monitoring systems 14, 16 are mounted to the propulsion system 12, the second equipment health monitoring system 16 may be mounted at a more accessible location than the first equipment health monitoring system 14, thus enabling faster deployment and removal. By way of a further example, the second equipment health monitoring system 16 may have fewer electrical connections to disconnect than the first equipment health monitoring system 14 and may consequently take less time to deploy and remove than the first equipment health monitoring system 14.

In some examples, the deployment and/or removal of the second equipment health monitoring system 16 may take less time than the deployment and/or removal of the first equipment health monitoring 14 due to the second equipment health monitoring system 16 requiring a lower level of clearance (for example, a lower amount paperwork and process) than the first equipment health monitoring system 14.

The propulsion system 12 may comprise one or more gas turbine engines (such as the gas turbine 121 illustrated in FIG. 2), and/or one or more reciprocating engines, and/or one or more electrical motors. The propulsion system 12 may be coupled to a vehicle to provide thrust and/or electrical power to the vehicle. Examples of vehicles include aircraft, automobiles, watercraft and locomotives.

Figure 2:
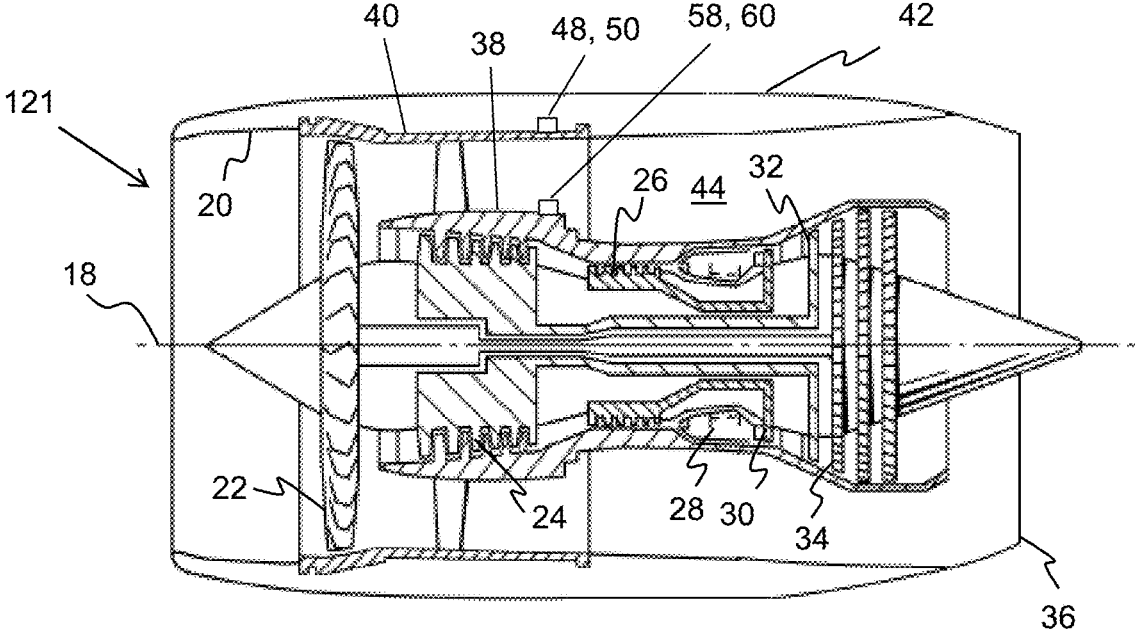
FIG. 2 illustrates a cross sectional side view of a gas turbine engine according to various examples.

FIG. 2 illustrates a cross sectional side view of a gas turbine engine 121 according to various examples. The gas turbine engine 121 has a principal and rotational axis 18 and comprises, in axial flow series, an air intake 20, a propulsive fan 22, an intermediate pressure compressor 24, a high-pressure compressor 26, combustion equipment 28, a high-pressure turbine 30, an intermediate pressure turbine 32, a low-pressure turbine 34 and an exhaust nozzle 36.

The gas turbine engine 121 also includes a core casing 38 and a low-pressure compressor casing 40. The core casing 38 surrounds the intermediate pressure compressor 24, the high-pressure compressor 26, the combustion equipment 28, the high-pressure turbine 30, the intermediate pressure turbine 32 and the low-pressure turbine 34. The core casing 38 may be modular (that is, comprise several casing segments that connect to one another via fasteners to provide the core casing 38), or may be continuous and unitary. The low-pressure compressor casing 40 surrounds the fan 22, the low-pressure compressor 24 and at least a portion of the core casing 38. A nacelle 42 generally surrounds the engine 121 and defines both the intake 20 and the exhaust nozzle 36.

The gas turbine engine 121 operates so that air entering the intake 20 is accelerated by the fan 22 to produce two air flows: a first air flow into the intermediate pressure compressor 24 and a second air flow which passes through a bypass duct 44 to provide propulsive thrust. The intermediate pressure compressor 24 compresses the air flow directed into it before delivering that air to the high-pressure compressor 26 where further compression takes place.

The compressed air exhausted from the high-pressure compressor 26 is directed into the combustion equipment 28 where it is mixed with fuel and the mixture combusted. The resultant hot combustion products then expand through, and thereby drive the high, intermediate, and low-pressure turbines 30, 32, 34 before being exhausted through the nozzle 36 to provide additional propulsive thrust. The high, intermediate, and low-pressure turbines 30, 32, 34 drive respectively the high-pressure compressor 26, intermediate pressure compressor 24 and fan 22, each by a suitable interconnecting shaft.

Other gas turbine engines to which the present disclosure may be applied may have alternative configurations. By way of example such gas turbine engines may have an alternative number of interconnecting shafts (two, for example) and/or an alternative number of compressors and/or turbines. Further, such gas turbine engines may comprise a gearbox provided in the drive train from a turbine to a compressor and/or fan.

Figure 3:
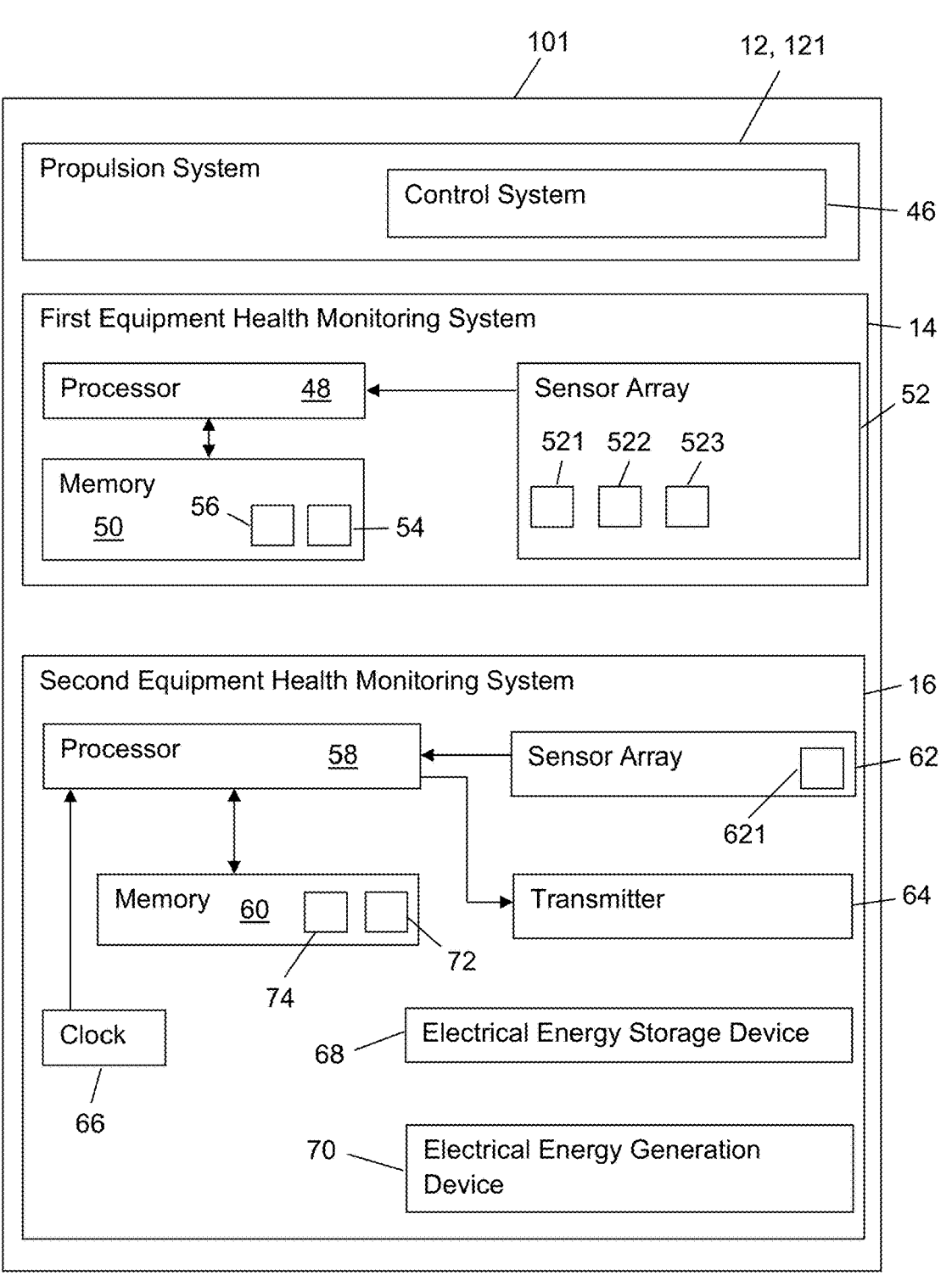
FIG. 3 illustrates a schematic diagram of another apparatus according to various examples.

FIG. 3 illustrates a schematic diagram of another apparatus 101 according to various examples. The apparatus 101 is similar to the apparatus 10 illustrated in FIG. 1 and where the features are similar, the same reference numerals are used. The apparatus 101 includes a propulsion system 12, a first equipment health monitoring system 14 and a second equipment health monitoring system 16.

The propulsion system 12 includes a control system 46 that is configured to control the operation of the propulsion system 12. For example, where the propulsion system 12 includes a gas turbine engine (such as the gas turbine engine 121), the control system 46 may be configured to control the flow of fuel to the combustion equipment 28, the orientation of variable guide vanes in the intermediate-pressure compressor 24, and the restriction provided by bleed valves in the gas turbine engine. The control system 46 may include an electronic engine controller (EEC) or a full authority digital engine controller (FADEC).

The first equipment health monitoring system 14 includes a processor 48, a memory 50 and a sensor array 52. The processor 48 (and optionally, the memory 50) may be mounted to the low-pressure compressor casing 40 of the gas turbine engine 121 (as illustrated in FIG. 2). The sensor array 52 may be positioned at various locations of the gas turbine engine 121 to monitor the plurality of parameters of the gas turbine engine 121.

The first equipment health monitoring system 14 may be separate to the control system 46 or may be a part of the control system 46. For example, where the first equipment health monitoring system 14 is a part of the control system 46, the processor 48, the memory 50 and the sensor array 52 may be a part of the control system 46 (that is, the processor 48, the memory 50 and the sensor array 52 may be configured to enable control and monitoring of the propulsion system 12, 121 and the processor 48 and the memory 50 may be mounted on a motherboard of the control system 46). By way of another example, the first equipment health monitoring system 14 may be separate to the control system 46 in that the electronic components of the first equipment health monitoring system 14 may be physically connected to a different motherboard to the electronic components of the control system 46.

The processor 48 may comprise: at least one application specific integrated circuit (ASIC); and/or at least one field programmable gate array (FPGA); and/or single or multi-processor architectures; and/or sequential/parallel architectures; and/or at least one microprocessor; and/or at least one microcontroller; and/or a central processing unit (CPU); and/or a graphics processing unit (GPU). The processor 48 may be electrically connected to a processor of the control system 46 and may be configured to send data to, and receive data from the control system 46.

The memory 50 may be any suitable non-transitory computer readable storage medium, data storage device or devices, and may comprise a hard disk drive and/or a solid-state drive. The memory 50 may be permanent non-removable memory. The memory 50 may include: local memory employed during actual execution of computer readable program code; bulk storage; and cache memories which provide temporary storage of at least some computer readable or computer usable program code to reduce the number of times code may be retrieved from bulk storage during execution of the code.

The memory 50 stores a computer program 54 comprising computer readable instructions that, when read by the processor 48, cause performance of the methods described herein, and as illustrated in FIG. 6. The computer program 54 may be software or firmware, or may be a combination of software and firmware.

Input/output devices may be coupled to the processor 48 either directly or through intervening input/output controllers. Various communication adaptors may also be coupled to the processor 48 to enable the first equipment health monitoring system 14 to become coupled to other systems or storage devices through intervening private or public networks. Non-limiting examples include modems and network adaptors of such communication adaptors.

The sensor array 52 includes a plurality of sensors 521, 522, 523 that are configured to monitor the plurality of parameters of the propulsion system 12, 121. For example, the sensor 521 may be a pressure sensor that is configured to monitor a pressure within the intermediate pressure compressor 24, the sensor 522 may be a thermocouple that is configured to monitor a temperature within the intermediate pressure compressor 24, and the sensor 523 may be a pressure sensor that is configured to monitor a pressure within the high-pressure compressor 26.

The sensor array 52 is configured to generate data for the plurality of parameters of the propulsion system 12, 121. The processor 48 is configured to receive the data generated by the sensor array 52 and may control storage of the data in the memory 50 as stored data 56. It should be appreciated that while three sensors are illustrated in FIG. 3, the sensor array 52 may include any number of sensors for monitoring the plurality of parameters.

The second equipment health monitoring system 16 includes a processor 58, a memory 60, and a sensor array 62. In some examples, the second equipment health monitoring system 16 may additionally include a transmitter 64, and/or a clock 66, and/or an electrical energy storage device 68, and/or an electrical energy generation device 70. The processor 58 (and optionally, the memory 60, the transmitter 64, the clock 66, the electrical energy storage device 68, and the electrical energy generation device 70) may be mounted to the core casing 38 of the gas turbine engine 121 (as illustrated in FIG. 2). Alternatively, the processor 58 (and optionally, the memory 60, the transmitter 64, the clock 66, the electrical energy storage device 68, and the electrical energy generation device 70) may be mounted to the low-pressure compressor casing 40 of the gas turbine 121 in other examples. The sensor array 62 may be positioned at one or more locations of the gas turbine engine 121 to monitor at least one parameter of the gas turbine engine 121.

The second equipment health monitoring system 16 may be electrically isolated from the control system 46 of the propulsion system 12, 121. In other words, the second equipment health monitoring system 16 and the control system 46 may be configured so that no data may be communicated between them. Similarly, the second equipment health monitoring system 16 may be electrically isolated from the first equipment health monitoring system 14 so that no data may be communicated between them. Consequently, the second equipment health monitoring system 16 may be a physically and electrically separate system to the other electronic systems of the apparatus 101.

The processor 58 may comprise: at least one application specific integrated circuit (ASIC); and/or at least one field programmable gate array (FPGA); and/or single or multi-processor architectures; and/or sequential/parallel architectures; and/or at least one microprocessor; and/or at least one microcontroller; and/or a central processing unit (CPU); and/or a graphics processing unit (GPU).

The memory 60 may be any suitable non-transitory computer readable storage medium, data storage device or devices, and may comprise a hard disk drive and/or a solid-state drive. The memory 60 may be permanent non-removable memory, or may be hand-portable removable memory (such as a universal serial bus (USB) flash drive or a secure digital (SD) card). The memory 60 may include: local memory employed during actual execution of computer readable program code; bulk storage; and cache memories which provide temporary storage of at least some computer readable or computer usable program code to reduce the number of times code may be retrieved from bulk storage during execution of the code.

The memory 60 stores a computer program 72 comprising computer readable instructions that, when read by the processor 58, cause performance of the methods described herein, and as illustrated in FIG. 6. The computer program 72 may be software or firmware, or may be a combination of software and firmware.

Input/output devices may be coupled to the processor 58 either directly or through intervening input/output controllers. Various communication adaptors may also be coupled to the processor 58 to enable the second equipment health monitoring system 16 to become coupled to other systems or storage devices through intervening private or public networks. Non-limiting examples include modems and network adaptors of such communication adaptors.

The sensor array 62 includes one or more sensors 621 that are configured to monitor one or more parameters of the propulsion system 12, 121. At least one of the one or more parameters to be monitored by the sensor array 62 are different to the plurality of parameters to be monitored by the sensor array 52. For example, where the sensor array 52 is configured to monitor a pressure within the intermediate pressure compressor 24, a temperature within the intermediate pressure compressor 24, and a pressure within the high-pressure compressor 26, the sensor array 62 may comprise a thermocouple 621 that is configured to monitor a temperature within the high-pressure compressor 26.

The sensor array 62 is configured to generate data for the one or more parameters of the propulsion system 12, 121. The processor 58 is configured to receive the data generated by the sensor array 62 and may store the data in the memory 60 as stored data 74.

The transmitter 64 is configured to transmit the data 74 for the one or more parameters via a wired and/or a wireless link. In some examples, the transmitter 64 may comprise receiver circuitry that is configured to receive data from a data source external to the second equipment health monitoring system 16 (in these examples, the transmitter 64 may be referred to as a transceiver). The transmitter 64 may comprise a socket (for example, a Universal Serial Bus (USB) socket) that is configured to receive a plug connected to a cable to enable the communication of data over the cable. Additionally, or alternatively, the transmitter 64 may comprise radio frequency circuitry and an antenna that are configured to enable the communication of data over a wireless local area network (WLAN) or over a wireless wide area network (WWAN). The processor 58 is configured to read the data 74 stored in the memory 60 and control the transmitter 64 to transmit the data 74.

The clock 66 may be any suitable device (such as a quartz clock) that is configured to output a time. The processor 58 is configured to associate the data 74 of the one or more parameters of the propulsion system 12, 121 with the time output by the clock 66. For example, the processor 58 may be configured to periodically time stamp the data as the data is received from the sensor array 62.

The electrical energy storage device 68 may be any suitable device that is configured to store electrical energy and supply electrical energy to the components of the second equipment health monitoring system 16. For example, the electrical energy storage device 68 may be configured to supply electrical energy to one or more of: the processor 58, the memory 60, the sensor array 62, the transmitter 64, and the clock 66. The electrical energy storage device 68 may comprise one or more electrochemical cells and/or one or more supercapacitors.

The electrical energy generation device 70 may be any suitable device that is configured to generate electrical energy and supply electrical energy to the components of the second equipment health monitoring system 16. For example, the electrical energy generation device 70 may supply electrical energy to one or more of: the processor 58, the memory 60, the sensor array 62, the transmitter 64, the clock 66, and the electrical energy storage device 68. The electrical energy generation device 70 may comprise a thermoelectric generator.

Figure 4:
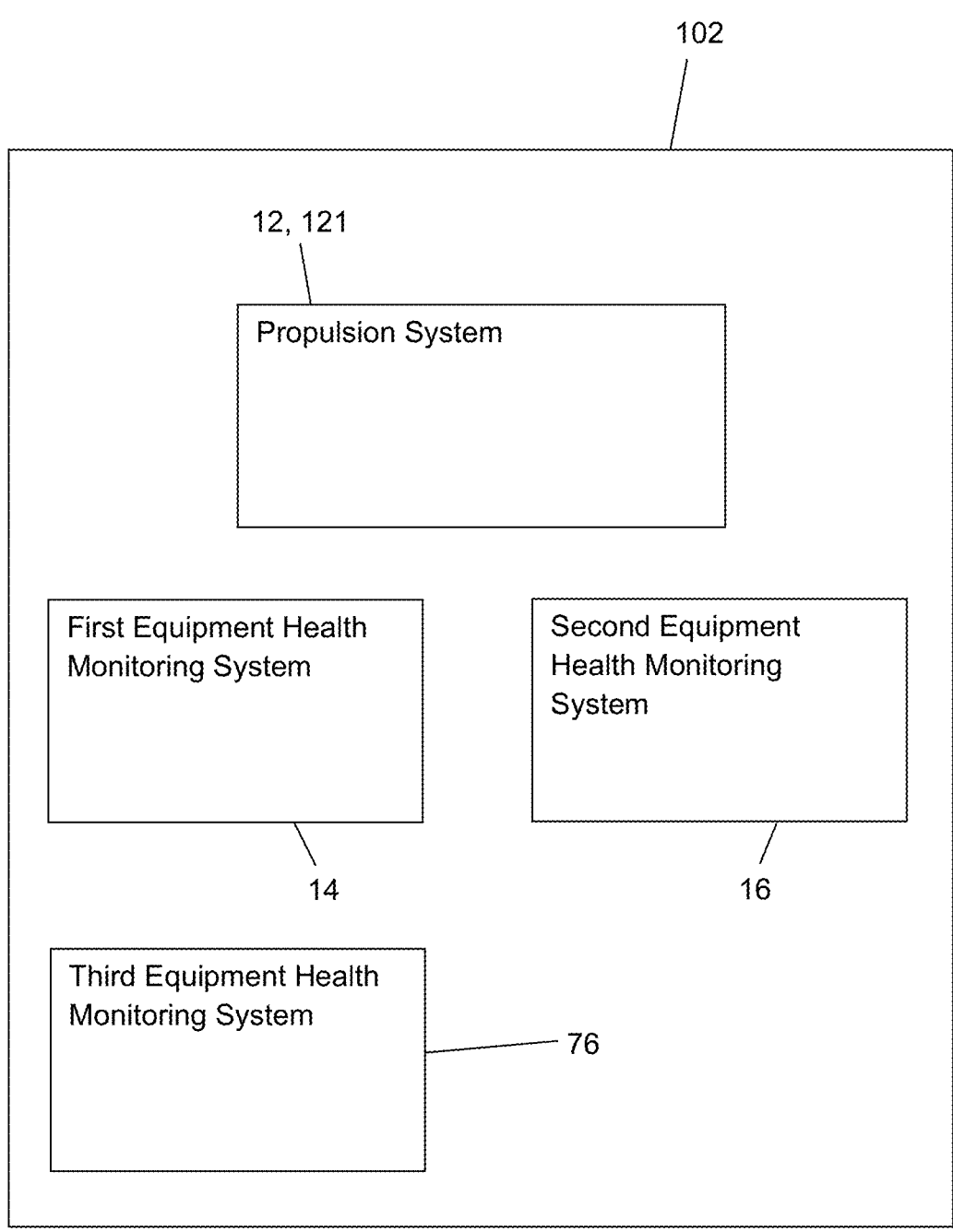
FIG. 4 illustrates a schematic diagram of a further apparatus according to various examples.

FIG. 4 illustrates a schematic diagram of a further apparatus 102 according to various examples. The apparatus 102 is similar to the apparatus 10, 101 and where the features are similar, the same reference numerals are used. In addition to the propulsion system 12, the first equipment health monitoring system 14 and the second equipment health monitoring system 16, the apparatus 102 includes a third equipment health monitoring system 76.

The third equipment health monitoring system 76 may have the same structure and functionality as the second equipment health monitoring system 16 as described in the preceding paragraphs. For example, the third equipment health monitoring system 76 may also comprise a processor 58, a memory 60, a sensor array 62 and optionally, a transmitter 64, a clock 66, an electrical energy storage device 68 and an electrical energy generation device 70.

The third equipment health monitoring system 76 is configured to generate data for one or more parameters of the propulsion system 12, 121. At least one of the one or more parameters to be monitored by the third equipment health monitoring system 76 is different to the plurality of parameters to be monitored by the first equipment health monitoring system 14, and different to the one or more parameters to be monitored by the second equipment health monitoring system 16. For example, where the first equipment health monitoring system 14 is configured to monitor a pressure within the intermediate pressure compressor 24, a temperature within the intermediate pressure compressor 24, and a pressure within the high-pressure compressor 26, and the second equipment health monitoring system 16 is configured to monitor a temperature within the high-pressure compressor 26, the third equipment health monitoring system 76 may be configured to monitor a temperature at the low-pressure turbine 34.

Figure 5:
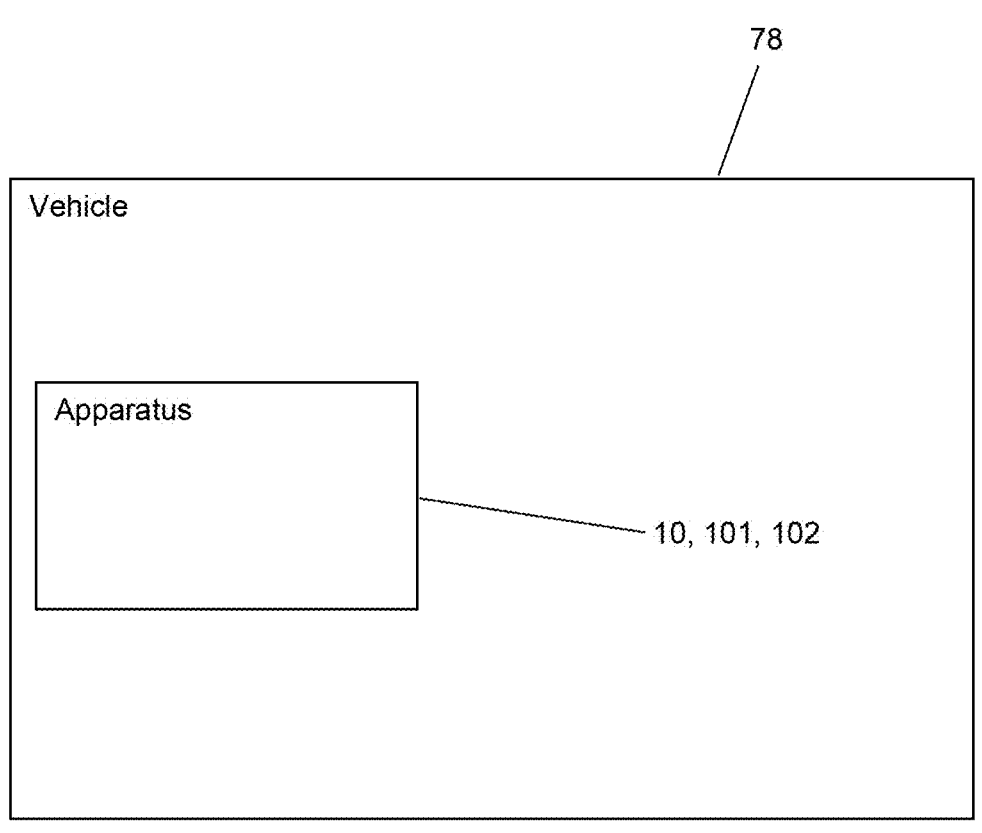
FIG. 5 illustrates a schematic diagram of a vehicle according to various examples.

FIG. 5 illustrates a schematic diagram of a vehicle 78 including an apparatus 10, 101, 102 according to various examples. The vehicle 78 may be an aircraft, an automobile, a watercraft, or a locomotive. In some examples, the vehicle 78 may comprise a plurality of apparatus 10, 101, 102. For example, where the vehicle 78 is an aircraft, a first apparatus 10, 101, 102 may be mounted to a first wing of the aircraft, and a second apparatus 10, 101, 102 may be mounted to a second wing of the aircraft.

The second equipment health monitoring system 16 and/or the third equipment health monitoring system 76 may be configured to additionally monitor one or more parameters of the vehicle 78 (for example, wind speed where the vehicle 78 is an aircraft). In some examples, the third equipment health monitoring system 16 may be configured to only monitor one or more parameters of the vehicle 76.

FIG. 6 illustrates a flow diagram of a method for monitoring the propulsion system 12, 121. As mentioned in the preceding paragraphs, during operation and/or testing of the propulsion system 12, 121 during a first time period, the sensor array 52 monitors the plurality of parameters and generates data. The processor 48 receives the data from the sensor array 52 and controls storage of the data 56 in the memory 50.

At block 79, the method includes receiving data from the first equipment health monitoring system 14. For example, the data 56 may be transferred from the memory 50 to a computer system that is separate from the first equipment health monitoring system 14. The data 56 may be transferred via a wired connection (for example, a cable connected to the first equipment health monitoring system 14), via a wireless connection (for example, via a wireless local area network (WLAN) or via a wireless wide area network (WWAN)), or by transferring the data 56 to a removable memory and then transferring the data 56 from the removable memory to the computer system.

At block 80, the method includes determining whether the data received from the first equipment health monitoring system 14 includes data for a first parameter of the propulsion system 12, 121. For example, a person or the computer system may analyse the data received from the first equipment health monitoring system 14 to determine whether the data includes data for a temperature within the high-pressure compressor 26. In other examples, the determination may be made by a person or a computer reviewing the parameters that may be monitored by the first equipment health monitoring system 14 to understand whether those parameters include the first parameter.

Block 80 may be triggered by an outcome of an inspection that identifies that the propulsion system 12, 121 is in an unexpected condition (for example, an inspection may identify a higher level of wear on one more blades or vanes than expected). Additionally or alternatively, block 80 may be triggered by a health monitoring schedule that requires a review of additional engine health data after a predetermined period of time or uses of the propulsion system 12, 121.

At block 82, the method includes instructing deployment of the second equipment health monitoring system 16 to monitor the first parameter where it is determined that the data received from the first equipment health monitoring system 14 does not include data for the first parameter. For example, where a person or the computer system determines at block 80 that the data received from the first equipment health monitoring system 14 does not include temperature data for the high-pressure compressor 26, they may compose and send a message (such as an e-mail) to people at an airport that instructs them to deploy the second equipment health monitoring system 16 to monitor the temperature of the high-pressure compressor 26.

At block 84, the method may include deploying the second equipment health monitoring system 16 in response to receiving the instruction to deploy the second equipment health monitoring system 16. For example, a person may read the message composed and sent at block 82 and then deploy the second equipment health monitoring system 16 as instructed in the message to enable the monitoring of temperature in the high-pressure compressor 26. In particular, the person may mount at least the processor 58 and the memory 60 on the core casing 38, and may mount a temperature sensor 621 (a thermocouple for example) in the high-pressure compressor 26. The person may then connect the temperature sensor 621 to the processor 58 via a cable or via a wireless link.

Once the second equipment health monitoring system 16 has been deployed, the propulsion system 12, 121 may be operated and/or tested for a second time period. The sensor array 62 monitors at least the first parameter of the propulsion system 12, 121 and generates data. The processor 58 receives the data from the sensor array 62 and controls the storage of the data 74 in the memory 60.

At block 86, the method may include receiving data from the second equipment health monitoring system 16 for the first parameter. For example, the data 74 may be transferred from the memory 60 to a computer system that is separate from the second equipment health monitoring system 16 (the computer system may be the same computer system, or a different computer system to the one described above for block 79). The data 74 may be transferred via a wired connection (for example, a cable connected to the second equipment health monitoring system 16), via a wireless connection (for example, via a wireless local area network (WLAN) or a wireless wide area network (WWAN)), or by physically removing the memory 60 from the second equipment health monitoring system 16 and electrically connecting the memory 60 to the computer system.

It should be appreciated that block 86 may be performed repeatedly over a period of time between deployment and removal. For example, once the second equipment health monitoring system 16 has been deployed (and before removal of the second equipment health monitoring system 16), the propulsion system 12, 121 may be operated and/or tested for second, third and fourth time periods and block 86 may be performed at a time between the second and third time periods, at another time between the third and fourth time periods, and at a further time after the fourth time period.

At block 88, the method may include instructing removal of the second equipment health monitoring system 16 subsequent to receiving the data 74 for the first parameter. For example, a person or the computer system may first determine whether the data 74 for the first parameter has been received (for example, by determining whether a predetermined period of time has elapsed, or whether the quantity of data received has surpassed a threshold). Once a determination has been made that the data 74 has been received, the person or the computer system may compose and send a message (such as an e-mail) to people at an airport that instructs them to remove the second equipment health monitoring system 16.

At block 90, the method may include removing the second equipment health monitoring system 16. For example, a person may read the message composed and sent at block 88 and then remove the second equipment health monitoring system 16 as instructed in the message. In particular, the person may remove at least the processor 58 and the memory 60 from the core casing 38, and may remove the temperature sensor 621 from the high-pressure compressor 26. In other examples, a person may remove the second equipment health monitoring system 16 after a predetermined period of time has elapsed. Consequently, the removal of the second equipment health monitoring system 16 may not be dependent upon an instruction to remove being generated at block 88.

At block 92, the method may include analysing the data received from the second equipment health monitoring system 16 to determine a condition of the propulsion system 12, 121. The analytics at block 92 may be performed manually by a person (with or without a computer), or may be performed automatically by a computer. For example, a person may analyse the temperature data from the high-pressure compressor 26 using a data analytics tool on a computer (a spreadsheet application for example). The analysis may indicate that the temperature is higher than expected and that one or more bleed valves in the high-pressure compressor 26 are faulty. By way of another example, a computer may automatically analyse the temperature data from the high-pressure compressor 26 upon receiving the data from the second equipment health monitoring system 16 (for example, by inputting the temperature data into a trained machine learning algorithm).

At block 94, the method may include inspecting the propulsion system 12, 121 using the determined condition of the propulsion system 12, 121. For example, a person may use the determination of faulty bleed valves at block 94 to carry out an inspection of the bleed valves of the high-pressure compressor 26. Where one or more components of the propulsion system 12, 121 are determined to be faulty and/or worn at block 94, the method may include repairing or replacing the one or more components.

The apparatus 10, 101, 102 and the methods described above may provide several advantages. As discussed in the preceding paragraphs, the second equipment health monitoring system 16 may enable one or more parameters of the propulsion system 12, 121 to be monitored that cannot be monitored by the first equipment health monitoring system 14. This is advantageous when a fault occurs with the propulsion system 12, 121 and the data being received from the first equipment health monitoring system 14 does not enable diagnosis of the fault.

The ability to rapidly deploy and remove the second equipment health monitoring system 16 as needed or desired may also be advantageous in that it may enable the minimalization of the first equipment health monitoring system 14. In particular, the sensor array 52 may be configured to only have sensors for essential parameters, and the second equipment health monitoring system 16 may be deployed when it is desired to monitor non-essential parameters.

Furthermore, the ability to rapidly deploy and remove the second equipment health monitoring system 16 as needed or desired may be advantageous in that it may performed while the propulsion system 12, 121 is mounted on the vehicle 78

(that is, the deployment and removal may be performed in-situ). This may help to maximize the availability of the vehicle 78 for operations.

The provision of a dedicated processor 58 for the second equipment health monitoring system 16 may be advantageous in that the processor 58 may not be required to comply with a high design assurance level (such as design assurance level A (DAL-A)). This may enable a higher processing power and commercial off the shelf (COTS) processor to be used for the processor 58. Such a processor may be able to perform a wider variety of calculations (including more demanding algorithms such as machine learning algorithms) and may be less costly than the processor 48 of the first equipment health monitoring system 14, or a processor of the control system 46.

The memory 60 being removable and hand portable may be advantageous in that such memory may enable the rapid transfer of the data 74 stored on the memory 60. For example, a person at an airport may relatively quickly remove the memory 60, without removing any other components of the second equipment health monitoring system 16, and transfer the data 74 to another computer (a laptop for example). This process may take less time than one in which the data 74 is transferred to a computer via a cable.

The provision of a wireless transmitter 64 may be advantageous in that such a transmitter may enable the rapid transfer of the data 74 stored on the memory 60. For example, the data 74 may be transferred automatically and wirelessly upon the transmitter 64 coming into range of a receiver at an airport. This process may take less time than one in which the data 74 is transferred to a computer via a cable, or via a removable memory as described in the preceding paragraph.

The electrical energy storage device 68 and/or the electrical energy generation device 70 may advantageously supply electrical energy to the components of the second equipment health monitoring system 16. Consequently, the second equipment health monitoring system 16 may operate independently to the propulsion system 12, 121, the first equipment health monitoring system 14, and any other system of the vehicle. Additionally, as the second equipment health monitoring system 16 does not need to be electrically connected to an electrical power supply of the propulsion system 12, 121 or the vehicle 76, the second equipment health monitoring system 16 may be faster to deploy and remove relative to the first equipment health monitoring system 14 (which may be connected to an electrical power supply of the propulsion system 12, 121).

It will be understood that the patent application is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An apparatus comprising:
   a gas turbine engine including a control system configured to control operation of the gas turbine engine;
   a first equipment health monitoring system including a first processor, a first memory, and a first sensor array (i) positioned at various locations of the gas turbine engine to enable monitoring of a plurality of parameters of the gas turbine engine and (ii) being configured to generate first data for the plurality of parameters of the gas turbine engine, the processor being programmed to receive the first data generated by the first sensor array;

a second equipment health monitoring system including a second processor, a second memory, and a second sensor array (i) positioned at one or more locations of the gas turbine engine to enable monitoring of one or more parameters of the gas turbine engine and (ii) configured to generate second data for the one or more parameters of the gas turbine engine, at least one of the one or more parameters to be monitored by the second equipment health monitoring system being different than the plurality of parameters to be monitored by the first equipment health monitoring system, wherein the first equipment health monitoring system is electrically connected to the control system of the gas turbine engine, and the second equipment health monitoring system is electrically isolated from the control system.

2. The apparatus as claimed in claim 1, wherein the second memory of the second equipment health monitoring system is configured to store the second data for the one or more parameters of the gas turbine engine.

3. The apparatus as claimed in claim 2, wherein the second memory of the second equipment health monitoring system is hand removable.

4. The apparatus as claimed in claim 1, wherein the second equipment health monitoring system includes a transmitter configured to transmit, via a wired or wireless link, the second data for the one or more parameters of the gas turbine engine.

5. The apparatus as claimed in claim 1, wherein the second equipment health monitoring system includes a clock configured to output a time, the second equipment health monitoring system being configured to associate the second data for the one or more parameters of the gas turbine engine with the time output of the clock.

6. The apparatus as claimed in claim 1, wherein the second equipment health monitoring system comprises an electrical energy storage device configured to supply electrical power to the second equipment health monitoring system.

7. The apparatus as claimed in claim 6, wherein the electrical energy storage device is configured to supply electrical power to one or more sensors of the second sensor array of the second equipment health monitoring system.

8. The apparatus as claimed in claim 1, wherein the second equipment health monitoring system comprises an electrical energy generating device configured to supply electrical power to the second equipment health monitoring system.

9. The apparatus as claimed in claim 8, wherein the electrical energy generating device comprises a thermoelectric generator.

10. The apparatus as claimed in claim 1, wherein the gas turbine engine comprises a low-pressure compressor casing and a core casing, the first processor of the first equipment health monitoring system being mounted on the low-pressure compressor casing, and the second processor of the second equipment health monitoring system being mounted on the core casing.

11. The apparatus as claimed in claim 1, further comprising a third equipment health monitoring system configured to generate third data for one or more parameters of the gas turbine engine, at least one of the one or more parameters to be monitored by the third equipment health monitoring system being different than the plurality of parameters to be monitored by the first equipment health monitoring system, and different to than the one or more parameters to be monitored by the second equipment health monitoring system.

12. A vehicle comprising the apparatus as claimed in claim 1.

* * * * *